United States Patent
Shin et al.

(10) Patent No.: US 7,695,695 B2
(45) Date of Patent: Apr. 13, 2010

(54) REACTOR OR HEAT EXCHANGER WITH IMPROVED HEAT TRANSFER PERFORMANCE

(75) Inventors: Sang Baek Shin, Daejeon (KR); Sang Phil Han, Daejeon (KR); Ye Hoon Im, Daejeon (KR); Young Bae Kim, Yeosu-si (KR); Jung Hoon Chang, Yeosu-si (KR); Sang Oeb Na, Yeosu-si (KR); Won Am Lee, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 505 days.

(21) Appl. No.: 11/654,529

(22) Filed: Jan. 18, 2007

(65) Prior Publication Data
US 2007/0167647 A1    Jul. 19, 2007

(30) Foreign Application Priority Data

Jan. 18, 2006  (KR) .................. 10-2006-0005453
Jan. 31, 2006  (KR) .................. 10-2006-0009397

(51) Int. Cl.
  *B01J 19/00* (2006.01)
  *F28D 7/10* (2006.01)

(52) U.S. Cl. .................. 422/198; 422/201; 422/202; 422/211; 165/81; 165/140; 568/476; 562/532

(58) Field of Classification Search ............. 422/197, 422/198, 201, 202, 211; 165/81, 140; 562/532; 568/476
See application file for complete search history.

(56) References Cited

U.S. PATENT DOCUMENTS

| | | | |
|---|---|---|---|
| 3,871,445 A | 3/1975 | Wanka et al. | |
| 4,256,783 A * | 3/1981 | Takada et al. | 422/197 |
| 6,431,261 B2 * | 8/2002 | Nishimura et al. | 165/81 |
| 6,756,023 B1 * | 6/2004 | Corr et al. | 422/198 |
| 6,808,689 B1 * | 10/2004 | Matsumoto et al. | 422/196 |
| 7,144,557 B2 * | 12/2006 | Yada et al. | 422/196 |
| 7,297,814 B2 * | 11/2007 | Yada et al. | 562/532 |
| 7,438,871 B2 * | 10/2008 | Ha et al. | 422/198 |
| 2006/0257301 A1 * | 11/2006 | Shin et al. | 422/198 |
| 2007/0202022 A1 * | 8/2007 | Shin et al. | 422/201 |

FOREIGN PATENT DOCUMENTS

| | | |
|---|---|---|
| CN | 1096877 | 12/1994 |
| EP | 1 097 745 B | 2/2005 |
| JP | H08-94284 A | 4/1996 |
| WO | WO 2005/010450 A1 | 2/2005 |

* cited by examiner

*Primary Examiner*—N. Bhat
(74) *Attorney, Agent, or Firm*—McKenna Long & Aldridge LLP (57) ABSTRACT

A shell-and-tube reactor or heat exchanger comprises first tubes, through the inside of which a first object for heat transfer with a heat transfer medium is passed, some of the first tubes being provided in a zone in which a flow of the heat transfer medium (parallel flow) parallel to the axis of the tubes is present; and a second tube, through the inside of which the first object is not passed, the second tube being provided in said zone such that it is parallel to the axis of the first tubes. A method for producing an oxide comprises using said shell-and-tube reactor or heat exchanger, and causing a catalytic vapor-phase oxidation reaction in first tubes, through the inside of which the first object for heat transfer with the heat transfer medium is passed.

17 Claims, 5 Drawing Sheets

FIG. 4 zone 10 in which reaction tubes are located

REACTOR OR HEAT EXCHANGER WITH IMPROVED HEAT TRANSFER PERFORMANCE

This application claims the benefit of Korean Patent Application Nos. 10-2006-5453 and 10-2006-9397, filed Jan. 18, 2006 and Jan. 31, 2006, respectively in Korea, which are hereby incorporated by reference in their entirety for all purposes as if fully set forth herein.

TECHNICAL FIELD

The present invention relates to a shell-and-tube reactor or heat exchanger, in which some of first tubes, through the inside of which a first object for heat transfer with a heat transfer medium is passed, are present in a zone in which a flow of the heat transfer medium (parallel flow) parallel to the axis of the tubes is present, and a second tube, through the inside of which the first object is not passed, is provided in said zone such that it is parallel to the axis of the first tubes.

BACKGROUND ART

Generally, a shell-and-tube heat exchanger-type catalytic reactor is a kind of reactor which is used to efficiently remove reaction heat. In such a reactor, a solid catalyst is filled in a plurality of reaction tubes, reaction gas is fed into the reaction tubes to cause a chemical reaction for obtaining a desired product, and a heat transfer medium is circulated through the reactor shell such that the chemical reaction can occur in the optimal state.

In the shell-and-tube catalytic reactor, hot spots tend to occur at a local point in the reaction tubes, and such hot spots cause problems, such as the deterioration of a catalyst, leading to a reduction in catalyst life, and a reduction in the selectivity to the desired product. Thus, various methods for efficiently transferring heat to the reaction tubes in the reactor to reduce hot spots have been attempted.

Korean Patent Laid-Open Publication No. 2001-0050267, for example, discloses an attempt to improve heat transfer performance by maintaining a constant flow rate of a heat transfer medium in any zone in a reactor through the use of a shell-and-tube heat exchanger, which comprises a circulator for the heat transfer medium, and doughnut-type and disc-type baffle plates, which are alternately disposed in the reactor shell. Also, circulation channels without reaction tubes are provided between an upper tube sheet and a lower tube sheet and between the peripheral portion and central portion in the cross section of the shell. Heat transfer medium can be transferred from the central portion to the peripheral portion or from the peripheral portion to the central portion through circulation channels in a shorter time than through the reaction tube region. Accordingly, the heat transfer medium passing through the circulation channel recovers only a small amount of reaction heat because of less frequent contact with the reaction tubes, such that it can reach the peripheral portion or the central portion at a relatively low temperature in a relatively short time, and thus can handle the reaction tubes in these portions with a relatively fresh condition of heat transfer medium.

DISCLOSURE OF THE INVENTION

The present inventors have found that, in a shell-and-tube reactor or heat exchanger, in which doughnut-type and disc-type baffle plates are alternately provided such that a heat transfer medium flows in an S-shape, a zone having markedly reduced heat transfer coefficient is present in a reaction tube located in the central portion in which the movement direction of the heat transfer medium is changed. Also, the present inventors have found that, in the case of the reactor, abnormal hot spots attributable to a reduction in heat transfer coefficient occur in reaction tubes present in a zone, in which heat transfer coefficient is remarkably decreased. Such abnormal hot spots increase possibilities for catalysts to deteriorate, leading to a reduction in catalyst life, the selectivity to the desired product to be reduced, and run-away reactions to be induced.

The present invention has been made in order to solve the above-described problem, and aims to provide a method for increasing the heat transfer coefficient of first tubes in a shell-and-tube reactor or heat exchanger, in which a first object for heat transfer with a heat transfer medium is passed through the inside of the first tubes, some of the first tubes being provided in a zone, in which a flow of the heat transfer medium (parallel flow) parallel to the axis of the tubes is present, the method comprising increasing the flow rate of the parallel flow by placing a second tube, through the inside of which the first object is not passed, in said zone such that the second tube is parallel to the axis of the first tubes.

Also, the present invention aims to dispose a passage for the heat transfer medium in the second tube such that the second tube serves to adjust the temperature of the heat transfer medium at a specific point in the shell of the reactor or heat exchanger.

The present invention provides a shell-and-tube reactor or heat exchanger comprising: first tubes, through the inside of which a first object for heat transfer with a heat transfer medium is passed, some of the first tubes being provided in a zone in which a flow of the heat transfer medium (parallel flow) parallel to the axis of the tubes is present; and a second tube, through the inside of which the first object is not passed, the second tube being provided in said zone such that it is parallel to the axis of the first tubes.

In one embodiment of the present invention, the second tube may include two or more passages for the inlet or outlet of the heat transfer medium.

In another embodiment of the present invention, a doughnut-type baffle plate and a disc-type baffle plate are alternately provided in the reactor or heat exchanger, such that the heat transfer medium flows in an S-shape. Accordingly, a parallel flow is formed inside of the doughnut-type baffle plate in the central portion of the reactor or heat exchanger, and thus a second tube can be placed in the central portion.

The diameter D1 of the second tube is preferably adjusted in a range of 5-25% of the inner diameter D4 of the reactor or heat exchanger shell, and more preferably a range of 10-20% of D4.

The inner diameter D3 of the doughnut-type baffle plate is preferably adjusted in a range of 20-50% of the inner diameter D4 of the shell of the reactor or heat exchanger, and the inside diameter D2 of the zone, in which the first tubes are present, is preferably adjusted such that the distance from the second tube, i.e., (D2−D1)/2, is 50-500 mm or in a range of 0.5-10% of D4, and the distance from the doughnut-type baffle plate, i.e., (D3−D2)/2, 200-1000 mm or in a range of 3-20% of D4.

Also, the present invention provides a method for increasing the heat transfer coefficient of first tubes, through the inside of which a first object for heat transfer with a heat transfer medium is passed, the first tubes being provided in a zone, in which a flow of the heat transfer medium (parallel flow) parallel to the axis of the tubes is present, the method comprising increasing the flow rate of the parallel flow by placing a second tube, through the inside of which the first object is not passed, in said zone such that the second tube is parallel to the axis of the first tubes.

Furthermore, the present invention provides a method for producing an oxide, comprising: using said shell-and-tube reactor or heat exchanger, and causing a catalytic vapor-phase oxidation reaction in first tubes, through the inside of which a first object for heat transfer with a heat transfer medium is passed.

Typical examples of the oxide formed by catalytic vapor-phase oxidation in the first tubes include unsaturated aldehyde and/or unsaturated fatty acid.

DESCRIPTION OF REFERENCE NUMERALS

1: reactor or heat exchanger shell;
2a: doughnut-type baffle plate;
2b: disc-type baffle plate;
3a, 3b and 3c: tube sheets;
4: reaction tubes;
5a: circular conduit into which heat transfer medium is fed;
5b: circular conduit from which heat transfer medium is discharged;
6: heat transfer medium;
7: reaction gas inlet;
8: reaction gas outlet;
9: non-reaction tube located at central portion;
10: heat transfer medium passage located in central non-reaction tube;
11: zone in which reaction tubes are located in reactor or heat exchanger;
12: inner circle of doughnut-type baffle plate;
13: internal boundary of zone in which reaction tubes are located;
14 and 14': distribution of heat transfer coefficient in reactor manufactured in Comparative Example;
15 and 15': distribution of heat transfer coefficient in reactor manufactured in Example;
16 and 16': internal temperature distribution of reaction tube in reactor manufactured in Comparative Example; and
17 and 17': internal temperature distribution of reaction tube in reactor manufactured in Example.

BEST MODE FOR CARRYING OUT THE INVENTION

Hereinafter, the present invention will be described in detail.

As used herein, the term "first tubes" refers to tubes, through the inside of which a first object for heat transfer with a heat transfer medium is passed. In the first tubes, a chemical or physical reaction can take place, and can be an exothermic or endothermic reaction. The first object for heat transfer with the heat transfer medium can be a reactant(s) before chemical or physical reaction, a product(s) after the reaction, or a mixture thereof, and may also be an object, which simply performs only heat transfer without any reaction.

As used herein, the term "second tube" refers to a tube, through the inside of which the first object for heat transfer with the heat transfer medium is not passed. If the second tube includes at least two passages for the inlet or outlet of the heat transfer medium, the heat transfer medium can be passed through the second tube.

The method for improving heat transfer efficiency, suggested in the present invention, can be applied to a system such as a catalytic reactor or a general heat exchanger, which does not aim to perform chemical reactions, the catalytic reactor or the general heat exchanger supplying or discharging fluid such as heat transfer medium, and it is not limited according to the kind of reaction gas in a reactor or the kind of heat transfer medium. In particular, the method according to the present invention is suitable for a shell-and-tube reactor or heat exchanger, which can be used in catalytic vapor-phase oxidation reactions.

Typical examples of catalytic vapor-phase oxidation reactions, to which reactors or heat exchangers having the structure according to the present invention can be applied, include processes of producing unsaturated aldehyde or unsaturated acid from olefin, non-limiting examples of which include a process of producing acrolein and/or acrylic acid by oxidation of propylene or propane, a process of producing (meth)acrolein and/or (meth)acrylic acid by oxidation of isobutylene, t-butylalcohol or methyl-t-butylether, a process of producing phthalic anhydride by oxidation of naphthalene or o-xylene, a process of producing maleic anhydride by partial oxidation of benzene, butylenes or butadiene, and the like.

The present invention has no limitation on the kind of the desired product such as (meth)acryklic acid or (meth)acrolein produced in the reactor, as long as the reactor having the structure according to the present invention is applied.

Hereinafter, the present invention will be described with reference to the use of a shell-and-tube catalytic reactor, but the present invention is not limited to the shell-and-tube catalytic reactor. In the shell-and-tube catalytic reactor, reaction tubes corresponds to the first tubes, a non-reaction tube to the second tubes, and reaction gas to the first object for heat transfer with the heat transfer medium.

The heat transfer medium is a kind of fluid, non-limiting examples of which include highly viscous media, for example, molten salt, which mainly consists of a mixture of potassium nitrate and sodium nitrite. Other examples of the heat transfer medium include phenyl ether media (e.g., "Dowtherm"), polyphenyl media (e.g., "Therm S"), hot oil, naphthalene derivatives (S.K. oil), mercury and the like.

Figure 1:
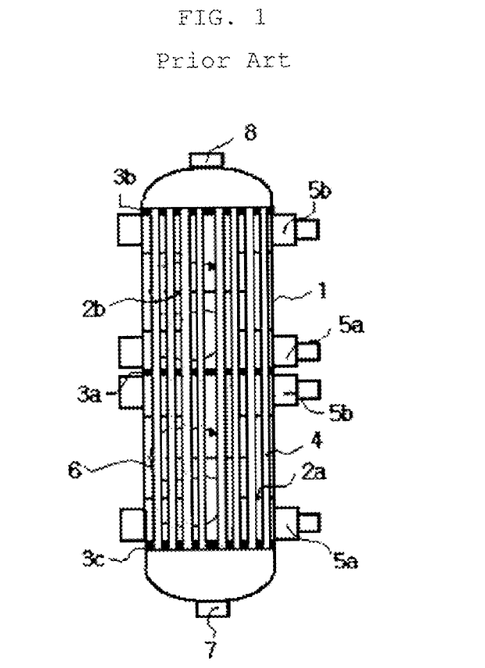
FIG. 1 is a cross-sectional view schematically showing the structure of a prior general shell-and-tube catalytic reactor or heat exchanger.

FIG. 1 is a cross-sectional view schematically showing the configuration of a prior shell-and-tube catalytic reactor having a cylindrical structure.

Referring to FIG. 1, the reactor comprises, in a cylindrical shell 1, a plurality of reaction tubes 4 fixed to a plurality of tube sheet 3a, 3b and 3c. The tube sheet 3a located in the middle of the reactor separates the shell into parts and allows reaction temperature to be controlled by an independent heat transfer medium. Each part of the shell includes a circular conduit 5a connected with a heat medium supply duct, and a circular conduit 5b connected with a heat medium discharge duct. A heat transfer medium 6 supplied through the circular conduit 5a connected with the supply duct flows along an S-shaped flow channel, formed by a doughnut-type baffle plate 2a and a disc-type baffle plate 2b, while it heat-exchanges with the reaction tubes 4. The reaction gas is fed through a reaction gas supply duct 7, is passed through the plurality of reaction tubes 4, after which it is collected together and discharged through an outlet duct 8.

Figure 2:
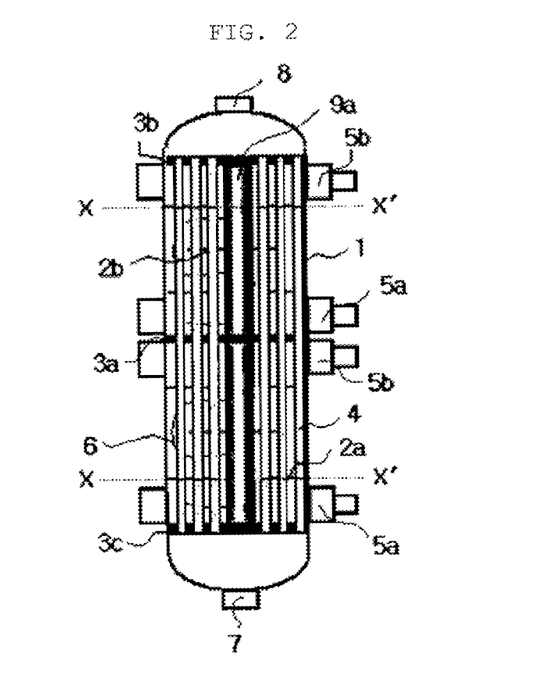
FIG. 2 is a cross-sectional view schematically showing the structure of a reactor or heat exchanger according to one embodiment of the present invention, in which a non-reaction tube having a given diameter is placed in the central portion of the reactor or heat exchanger in order to improve heat transfer efficiency.
Figure 3:
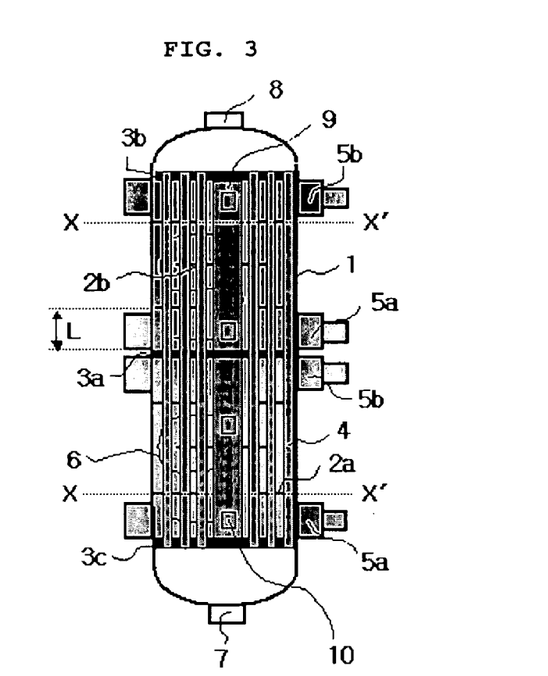
FIG. 3 is a cross-sectional view schematically showing the structure of a reactor or heat exchanger according to another embodiment of the present invention, in which a non-reaction tube, having a given diameter and a passage for the inlet or outlet of a heat transfer medium, is placed in the central portion of the reactor or heat exchanger in order to improve heat transfer efficiency.

To illustrate a non-reaction tube placed in the center of the shell in order to improve heat transfer efficiency according to one embodiment of the present invention, structures comprising a non-reaction tube 9 added to the prior shell-and-tube catalytic reactor of FIG. 1 are shown in FIGS. 2 and 3.

Figure 4:
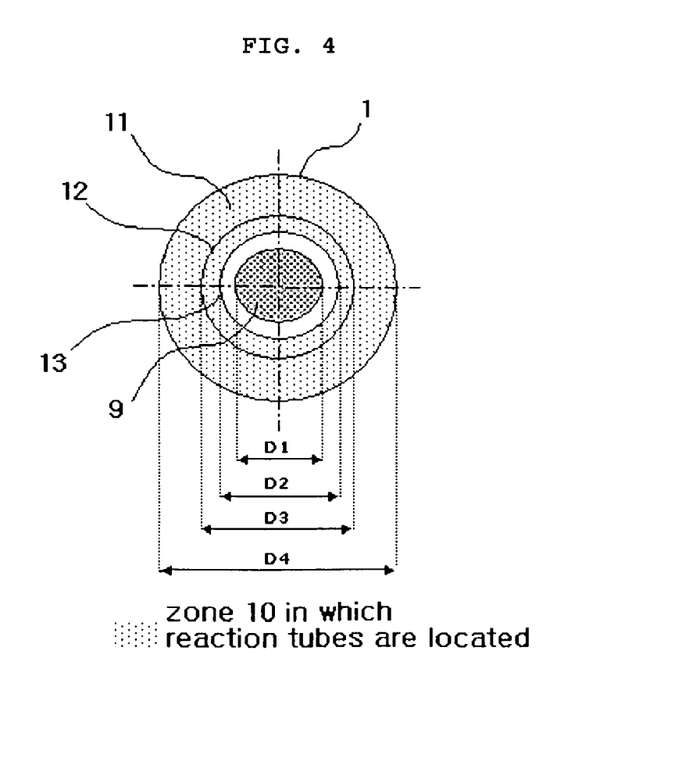
FIG. 4 is a cross-sectional view taken along line X-X' in FIG. 2 or 3, which illustrates the sizes of a non-reaction tube zone, a reaction tube zone and a doughnut-type baffle plate and shows the cross section of a reactor or heat exchanger according to an embodiment of the present invention, in which one non-reaction tube having a given diameter is placed in the center of the reactor or heat exchanger.

Also, a cross section view taken along line X-X' in FIGS. 2 and 3 is shown. In FIG. 4, D4 represents the inner diameter of the reactor shell, D3 the inside diameter of the doughnut-type baffle plate, D2 the inside diameter of a zone including the reaction tubes present therein, and D1 the diameter of the non-reaction tube in the center of the reactor, and the relationship of position and size between these diameters is illustrated in FIG. 4.

Figure 5:
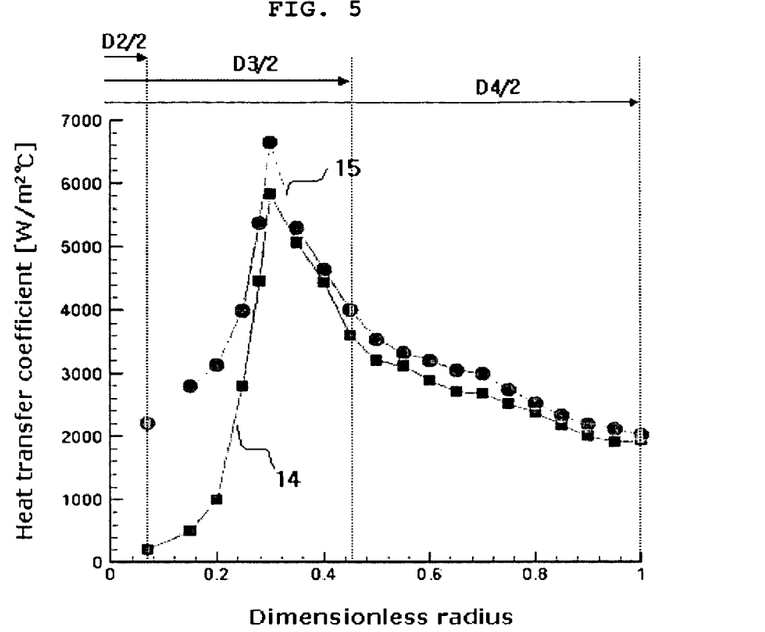
FIG. 5 is a graphic diagram showing the distribution of heat transfer coefficient in a reactor manufactured in each of Comparative Example 1 and Example 1.
Figure 7:
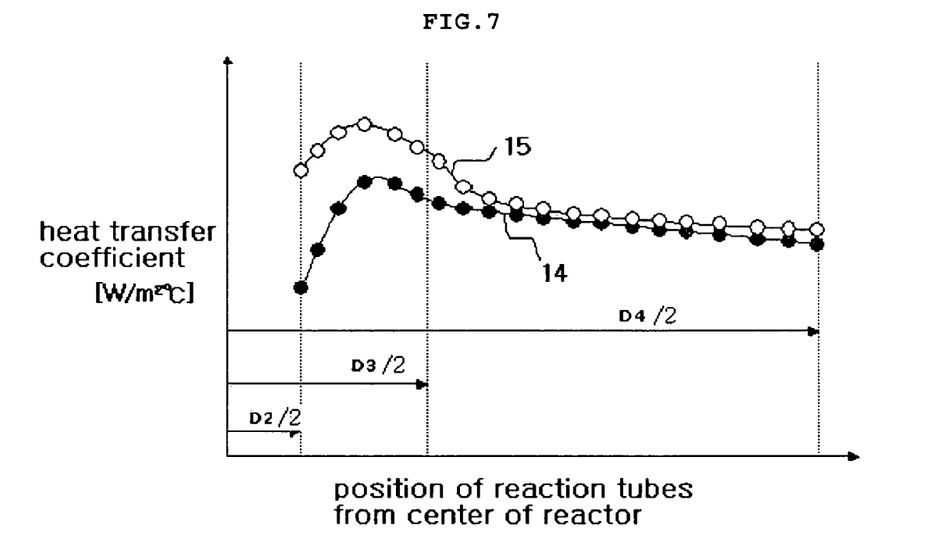
FIG. 7 is a graphic diagram showing the distribution of heat transfer coefficient in a reactor manufactured in each of Comparative Example 2 and Example 2.

FIGS. 5 and 7 are graphic diagrams comparatively showing heat transfer coefficient distributions 14 and 14' in prior reactors having no non-reaction tube in the middle (Comparative Examples 1 and 2), and heat transfer coefficient distributions 15 and 15' in inventive reactors having a non-reaction tube placed therein (Examples 1 and 2), the heat transfer coefficient distributions are being taken along line X-X' in FIGS. 2 AND 3.

As used herein, the term "heat transfer coefficient" refers to the heat transfer coefficient on a tube outer surface, caused by the heat transfer medium passing through the reactor shell.

As shown in FIGS. 5 and 7, in the prior reactor or heat exchanger having no non-reaction tube in the center thereof, heat transfer coefficient gradually increases in the inside diameter ($D_3$) of the doughnut-type baffle plate, and as it further moves toward the central portion, the heat transfer coefficient at a specific point reaches the highest value and then rapidly decreases toward the central potion.

The reason why heat transfer coefficient gradually increases in the inside diameter of the doughnut-type baffle plate is because the reactor or heat exchanger is cylindrical in shape, and thus a cross-sectional area for the flow of fluid decreases toward the central portion thereby to increase flow rate.

Meanwhile, the reason why heat transfer coefficient rapidly decreases toward the central portion after it reaches the highest value at a given point in the inside the diameter of the doughnut-type baffle plate is because the heat transfer medium no longer forms cross flow across the tubes due to a densely formed tube bundle and is converted to window flow or longitudinal flow along the axis of the tubes, in which the heat transfer coefficient in the case where the reaction tubes are brought into contact with the heat transfer medium in a parallel flow, which is in the same direction as the tube axis, becomes lower than the case where the reaction tubes are brought into contact with the heat transfer medium in a flow vertical to the tube axis.

When the non-reaction tube having a given size (D1) is located in the center of the reactor, a unit area for the flow of the heat transfer medium can be increased to increase the flow rate of the heat transfer medium in the parallel flow, thus increasing the heat transfer coefficient of reaction tubes, which are located inside the doughnut-type baffle plate and are located close to the central portion of the reactor. The zone in which the non-reaction tube is to be located is a zone in which the flow of the heat transfer medium is very insignificant. Thus, the zone has advantages in that it shows a very low increase in pressure loss, even though the non-reaction tube is placed therein, and the non-reaction tube can reduce the circulating amount of the heat transfer medium.

Figure 6:
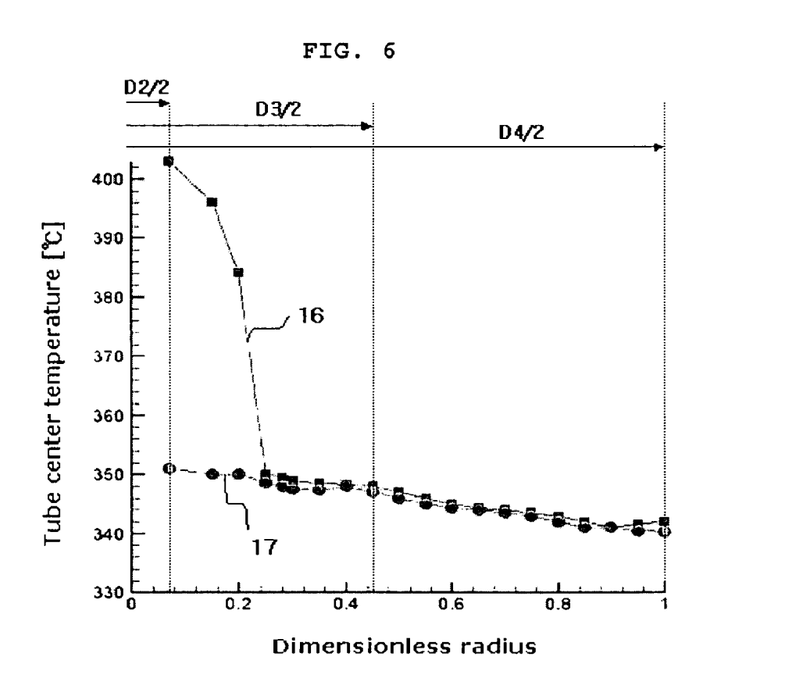
FIG. 6 is a graphic diagram showing the internal temperature distribution of reaction tubes in a reactor manufactured in each of Comparative Example 1 and Example 1.
Figure 8:
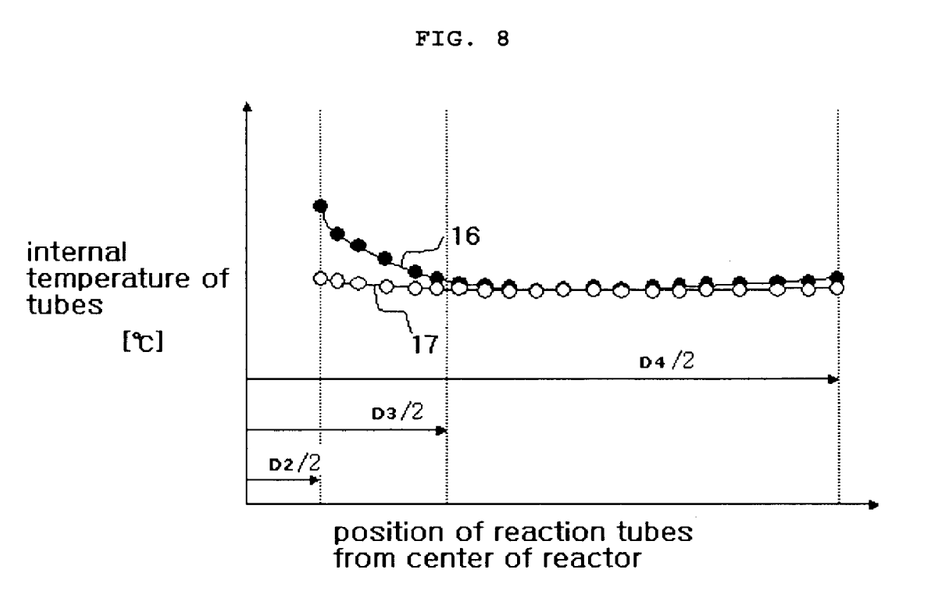
FIG. 8 is a graphic diagram showing the internal temperature distribution of a reaction tube in a reactor manufactured in each of Comparative Example 2 and Example 2.

FIGS. 6 and 8 are graphic diagrams comparatively showing the internal temperature distributions 16 and 16' of reaction tubes in the prior reactors having no non-reaction tube placed in the center thereof (Comparative Examples 1 and 2), and the internal temperature distributions 17 and 17' of reaction tubes in novel reactors having a non-reaction tube placed therein (Examples 1 and 2), the internal temperature distributions being taken along line X-X' in FIGS. 2 and 3. As shown in FIG. 5 and 7, the prior reactors having no non-reaction tube placed in the center thereof show a zone having low heat transfer coefficient in reaction tubes located close to the center of the reactors, and the zone having low heat transfer coefficient causes hot spots. However, in the case of the reactors having a non-reaction tube placed therein, the heat transfer coefficient of reaction tubes present in all the internal zones of the reactor has a value higher than the minimum value that can effectively remove the internal heat of the reaction tubes, and thus, almost similar temperature distributions are shown without causing hot spots. For this reason, the difference in heat transfer efficiency or performance resulting from a local position having parallel flow present therein will not occur, and in the case of the heat exchanger, overall heat transfer performance will be improved, and in the case of the reactor, it is possible to inhibit the generation of hot spots and increase the yield of the desired product.

Meanwhile, the diameter D1 of the non-reaction tube located in the center of the reactor is preferably adjusted in the range of 5-25% of the inner diameter D4 of the shell, and more preferably in the range of 10-20% of the inner diameter D4.

If the diameter D1 of the non-reaction tube is smaller than 5% of the inner diameter D4 of the shell, the effect of increasing heat transfer efficiency in the reaction tubes located in the central portion will be very insignificant, and if it is more than 25%, a space in which the reaction tubes are to be placed will be reduced, leading to a non-efficient reactor design.

The inside diameter D3 of the doughnut-type baffle plate is preferably adjusted in the range of 20-50% of the inner diameter D4 of the shell, and the inside diameter D2 of the zone having the reaction tubes present therein is preferably adjusted such that the distance from the non-reaction tube in the central portion, that is, (D2−D1)/2, is 50-500 mm or in the range of 0.5-10% of D4, and the distance from the doughnut-type baffle plate, that is, (D3−D2)/2, is 200-1000 mm or in the range of 3-20% of D4.

If the length of (D2−D1)/2 is smaller than 50 mm or 0.5% of D4, excessive pressure loss will be required to circulate the heat transfer medium through the shell, resulting in an increase in the capacity of a heat medium-circulating pump and an increase in operating cost. On the other hand, if the length of (D2−D1)/2 is larger than 500 mm or 10% of D4, a space in which the reaction tubes are to be placed will be decreased, leading to an inefficient reactor design.

If the length of (D3−D2)/2 is smaller than 200 mm or 3% of D4, although sufficient heat transfer coefficient can be obtained even if the reaction tubes are located closer to the central portion, the internal space of the reaction cannot be sufficiently utilized, resulting in an inefficient reactor design. On the other hand, if the length of (D3−D2)/2 is larger than 1000 mm or 20% of D4, a possibility for a zone having low heat transfer coefficient to occur in the reaction tubes located close to the central portion will be increased, and thus the advantages that are obtained by providing the non-reaction tube cannot be sufficiently obtained.

Figure 9:
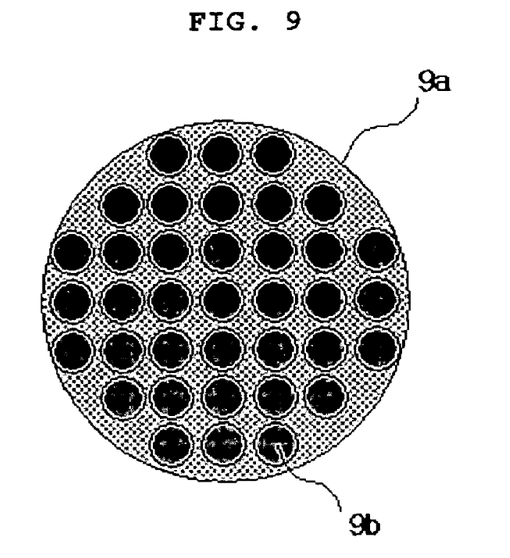
FIG. 9 is a cross-sectional view illustrating the structure of a plurality of small-diameter rod-type baffles or non-reaction tubes, which can be used instead of one non-reaction tube shown in FIG. 4.

Meanwhile, FIG. 9 is a cross-sectional view illustrating a structure having a plurality of small-diameter rod-type baffles 9b or non-reaction tubes 9b, which can be used instead of one non-reaction tube shown in FIGS. 2 and 3. When the plurality of rod-type baffles or non-reaction tubes are provided as such, it will be provided in the same area as that of the one non-reaction tube. Also, the rod-type baffles or non-reaction tubes are preferably symmetrically arranged with respect to the center thereof in order to prevent the disturbance of flow.

Moreover, the rod-type baffles or non-reaction tubes are preferably arranged at a central interval of 1.2-1.4 times the outer diameter thereof. If they are arranged at a central interval of more than 1.4 times, a possibility for a low-heat-transfer-coefficient zone to occur in the reaction tubes close to the center will be increased.

Meanwhile, as shown in FIG. 3, one non-reaction tube 9 having a specific diameter, placed in the center of the reactor, has a passage 10 for the heat transfer medium, so that a specific amount of the heat transfer medium can be introduced into or discharged from the tube 9 at a specific point.

When passages for the inlet or outlet of the heat transfer medium are provided at specific positions of the non-reaction tube, the heat transfer medium can be moved to other passes in a short time without coming into contact with the reaction tubes, such that it can be supplied to other passes at relatively low temperatures. Thus, it is possible to supply the heat transfer medium to a pass requiring contact with the heat transfer medium having a lower temperature. In the case of a catalytic reactor, there is an advantage in that a heat transfer medium having a lower temperature can be supplied to a portion in which reaction heat having a higher temperature occurs because various kinds of catalysts are filled in the longitudinal direction of the reactor, and reaction heat is also different in the longitudinal direction.

Figure 10:
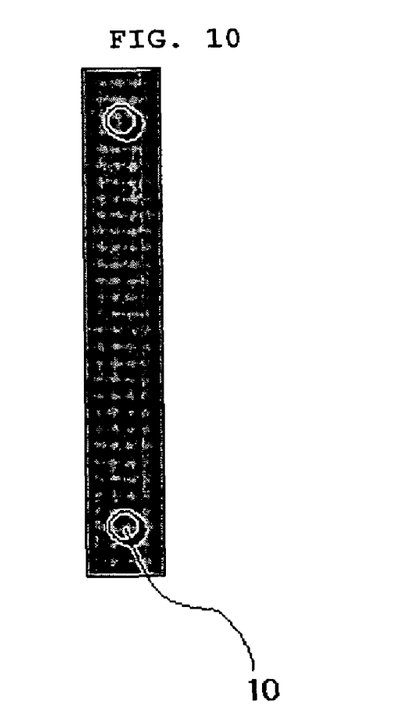
FIG. 10 is a schematic diagram showing the structure of a non-reaction tube having heat medium inlet or outlet passages for improving heat transfer efficiency and/or adjusting the temperature of the heat transfer medium at a specific point in the reactor shell.

In FIG. 10, the structure of a non-reaction tube having passages 10 for increasing heat transfer efficiency or adjusting the temperature of the heat transfer medium at a specific point in the shell is shown in further detail.

The heat transfer medium passage 10, through which the heat transfer medium passing through the non-reaction tube is passed, can have any shape and is preferably designed such that it has an area of a given size based on the surface area of the non-reaction tube. Assuming that the spacing distance between baffle plates (also including tube sheets) in a zone, in which the passage 10 for the inlet or outlet of the heat transfer medium is provided, is L (see FIG. 3), the size of the heat transfer medium passage 10 is preferably less than 50% of the non-reaction tube surface area corresponding to the length L. Specifically, if the outer diameter of the non-reaction tube is 300 mm and the spacing distance between the baffles in the zone is 750 mm, the surface area of the non-reaction tube is 0.053 m$^2$ (=π×0.15$^2$×0.75), and thus the passage for the inlet or outlet of the heat transfer medium is preferably provided in a size of less than 0.0265 m$^2$ corresponding to 50% of said surface area.

If the size of the heat transfer medium inlet or outlet passage is more than 50% of said area, a large amount of the heat transfer medium will be introduced into the non-reaction tube, resulting in a reduction in the effect of increasing heat transfer efficiency by providing the non-reaction tube in the center of the reactor.

The passage for the inlet or outlet of the heat transfer medium is selectively located in the heat transfer pass of the shell in the longitudinal direction of the tube.

The passage for the inlet or outlet of the heat transfer medium can be provided in a number of one or more with respect to a cross section vertical to the longitudinal direction of the tube, and if the number of the passages is more than two, these passages are preferably symmetrically arranged.

Referring to FIG. 3, four heat medium transfer passes are present in each of two shells, in which the shell, which is lower with respect to the upward flow of the heat transfer medium, has a structure in which the heat transfer medium is introduced into the passage at the first pass and discharged from the passage at the third pass, and the shell, which is located in the upper position, has a structure in which the heat transfer medium is introduced into the passage at the first pass and discharged from the passage at the fourth pass. Through such a structure, the heat transfer medium introduced in the first pass can be supplied to other passes at relatively low temperatures, because it moves to the third or fourth pass in a short time without coming into contact with the reaction tubes, and then comes into the reaction tubes. Thus, it is possible to supply the heat transfer medium to a pass requiring contact with the heat transfer medium having a lower temperature. In the case of a catalytic reactor, there is an advantage in that a heat transfer medium having a lower temperature can be supplied to a portion in which reaction heat having a higher temperature occurs, because various kinds of catalysts are filled in the longitudinal direction of the reactor, and reaction heat is also different in the longitudinal direction.

The non-reaction tube described above can be manufactured to have a structure described in the present invention by, for example, sealing and welding a given size of a tube to a tube sheet.

EXAMPLES

Hereinafter, the present invention will be described in further detail with reference to examples. It is to be understood, however, that these examples are illustrative only, and the scope of the present invention is not limited thereto.

Example 1

A reactor having a non-reaction tube placed in the center thereof as shown in FIG. 2 was manufactured in the following conditions.

Length of reaction tubes: 3250 mm
Inner diameter of reactor shell: 4150 mm
Inside diameter of doughnut-type baffle plate: 1600 mm
Inside diameter of zone in which reaction tubes are present: 500 mm
Diameter of non-reaction tube in center of reactor: 300 mm
Kind of heat transfer medium: molten salt (mixture of potassium nitrate and sodium nitrite)
Temperature of heat transfer medium: 310° C.
Kind of reaction gas: mixed gas (mixture of propylene, steam and air)
Injection temperature of reaction gas: 150° C.

Comparative Example 1

A reactor having no non-reaction tube placed in center thereof was manufactured in the following conditions.

Length of reaction tubes: 3250 mm
Inner diameter of reactor shell: 4150 mm
Inside diameter of doughnut-type baffle plate: 1600 mm
Inside diameter of zone in which reaction tubes are present: 500 mm
Kind of heat transfer medium: molten salt (mixture of potassium nitrate and sodium nitrite)
Temperature of heat transfer medium: 310° C.
Kind of reaction gas: mixed gas (mixture of propylene, steam and air)
Injection temperature of reaction gas: 150° C.

Example 2

A reactor having a non-reaction tube, which has passages for the heat transfer medium, placed in the center thereof as shown in FIG. 3 was manufactured in the following conditions.

Length of reaction tubes: 3250 mm
Inner diameter of reactor shell: 4150 mm
Inside diameter of doughnut-type baffle plate: 1600 mm
Inside diameter of zone in which reaction tubes are present: 500 mm
Diameter of non-reaction tube in center thereof: 300 mm
Spacing distance between baffles: 750-850 mm
Number of passes: 4 passes
Area of passage for inlet or outlet of heat transfer medium: 0.0134 m$^2$
Kind of heat transfer medium: molten salt (mixture of potassium nitrate and sodium nitrite)
Temperature of heat transfer medium: 310° C.
Kind of reaction gas: mixed gas (propylene, steam and air)
Injection temperature of reaction gas: 150° C.

Comparative Example 2

A reactor having no non-reaction tube placed in center thereof was manufactured in the following conditions.

Length of reaction tubes: 3250 mm
Inner diameter of reactor shell: 4150 mm
Inside diameter of doughnut-type baffle plate: 1600 mm
Inside diameter of zone in which reaction tubes are present: 500 mm
Spacing distance between baffles: 750-850 mm
Number of passes: 4 passes
Kind of heat transfer medium: molten salt (potassium nitrate and sodium nitrite)
Temperature of heat transfer medium: 310° C.
Kind of reaction gas: mixed gas (mixture of propylene, steam and air)
Injection temperature of reaction gas: 150° C.

<Consideration>

As shown in FIGS. 5 and 7, in the reactors of Comparative Examples 1 and 2, having no non-reaction tube in the center thereof and alternately comprising a doughnut-type baffle plate and a disc-type baffle plate, a zone having significantly reduced heat transfer coefficient was present in the reaction tubes located in the central portion in which the movement direction of the heat transfer medium was changed. Thus, as shown in FIGS. 6 and 8, in the reaction tubes present in the zone having significantly reduced heat transfer coefficient, abnormal hot spots resulting from the reduction in heat transfer efficiency occurred. Such abnormal hot spots increase possibilities for catalysts to deteriorate, leading to a reduction in catalyst life, the selectivity to the desired product to decrease, and run-away reactions to be induced.

The reactors of Examples 1 and 2, having the non-reaction tube placed in the center thereof, had heat transfer coefficient distributions 15 and 15' larger than those of the reactors of Comparative Examples 1 and 2, having no non-reaction tube therein, and thus the reactors of Examples 1 and 2 showed improved heat transfer efficiency. Thus, the hot spots occurring in the reaction tubes located in the central portion of the prior reactor structure no longer occurred in the reactors having the non-reaction tube in the center thereof.

In short, according to the present invention, when the non-reaction tube having a given size is placed in the center of the reactor, it is possible to eliminate the problem of hot spots occurring due to a reduction in heat transfer efficiency at a local position in the reaction tubes of the prior reactor, resulting in a loss of performance. Specifically, as shown in FIGS. 5, 6, 7 and 8, in the case of the inventive reactor or heat exchanger, all the reaction tubes have heat transfer coefficients higher than a given value to prevent hot spots from occurring therein, and thus a reduction in heat transfer efficiency or performance at a local position does not occur.

INDUSTRIAL APPLICABILITY

As can be seen from the foregoing, in the reactor or heat exchanger according to the present invention, in which the second tube such as a non-reaction tube is placed in a zone where a heat transfer medium flows in the longitudinal direction, for example, in the center of a cylindrical shell, the heat transfer efficiency of the first tubes, such as reaction tubes, placed in said zone or near there, can be increased without a great increase in pressure loss. Thus, all the tubes can have heat transfer coefficients higher than a given value to prevent hot spots from occurring therein, thus preventing a reduction in heat transfer efficiency or performance from occurring at a local position. Accordingly, in the case of the heat exchanger, it is possible to increase overall heat transfer performance, and in the case of the reactor, it is possible to inhibit the occurrence of hot spots and increase the yield of the desired product.

Also, the reactor or heat exchanger according to the present invention comprises a passage for the inlet or outlet of the heat transfer medium at a specific position in the second tube such as a non-reaction tube, and thus makes it possible to supply a heat transfer medium having a lower temperature to a pass requiring contact with this heat transfer medium.

Accordingly, in the reactor having the structure suggested in the present invention, (meth)acrylic acid and/or (meth)acrolein can be obtained with increased yield by catalytic vapor-phase oxidation of gas including propylene or isobutylene through a more stable operation in a smaller circulation amount of a heat transfer medium using a smaller amount of energy.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A shell-and-tube reactor or heat exchanger comprising:
   first tubes, through the inside of which a first object for heat transfer medium is passed, some of the first tubes being provided in a zone in which a flow of the heat transfer medium (parallel flow) parallel to the axis of the tubes is present; and
   a second tube, through the inside of which the first object is not passed, the second tube being provided in said zone such that it is parallel to the axis of the first tubes,
   wherein the second tube includes two or more passages for the inlet or outlet of the heat transfer medium, and
   the first object for heat transfer with the heat transfer medium is a reactant before chemical or physical reaction, a product after the reaction, or a mixture thereof 2. The shell-and-tube reactor or heat exchanger of claim 1, wherein the parallel flow is formed in the central portion of the reactor or heat exchanger, and the second tube is provided in the central portion.

3. The shell-and-tube reactor or heat exchanger of claim 1, wherein a doughnut-type baffle plate and a disc-type baffle plate are alternately provided such that the heat transfer medium flows in an S-shape, and a parallel flow is formed inside of the doughnut-type baffle plate.

4. The shell-and-tube reactor or heat exchanger of claim 1, wherein the diameter D1 of the second tube is in a range of 5-25% of the inner diameter D4 of the shell of the reactor or heat exchanger.

5. The shell-and-tube reactor or heat exchanger of claim 3, wherein the inside diameter D3 of the doughnut-type baffle plate is in a range of 20-50% of the inner diameter D4 of the shell of the reactor or heat exchanger.

6. The shell-and-tube reactor or heat exchanger of claim 3, wherein the inside diameter D2 of the zone, in which the first tubes are present, is adjusted such that the distance from the second tube, i.e., (D2-D1)/2, wherein D1 is the diameter of the second tube, is in a range of 0.5-10% of the inner diameter D4 of the shell of the reactor or heat exchanger, and the distance from the doughnut-type baffle plate, i.e., (D3-D2)/2, wherein D3 is the inside diameter of the doughnut-type baffle plate, is in a range of 3-20% of D4.

7. The shell-and-tube reactor or heat exchanger of claim 1, wherein at least one of the passages for the inlet or outlet of the heat transfer medium is located at a point where a temperature peak in the first tubes appears.

8. The shell-and-tube reactor or heat exchanger of claim 1, wherein two or more baffle plates for adjusting the flow of the heat transfer medium are provided in the reactor or heat exchanger, and assuming that the spacing distance between baffle plates in a zone, in which the passage for the inlet or outlet of the heat transfer medium is provided, is L, the size of the passage for the inlet or outlet of the heat transfer medium is 50% or less of the surface area of the second tube corresponding to the distance L.

9. The shell-and-tube reactor or heat exchanger of claim 1, wherein the second tube is provided in a number of two or more in one zone in which the parallel flow is present.

10. The shell-and-tube reactor or heat exchanger of claim 9, wherein the second tubes are symmetrically arranged with respect to the central point thereof.

11. The shell-and-tube reactor or heat exchanger of claim 10, wherein the second tubes are arranged at a central interval of 1.2-1.4 times the outer diameter thereof.

12. The shell-and-tube reactor or heat exchanger of claim 9, wherein the second tubes located at the outermost portion have two or more passages for the inlet or outlet of the heat transfer medium.

13. A method for producing an oxide, comprising:
   using a shell-and-tube reactor or heat exchanger set forth in claim 1, in which some of first tubes, through the inside of which a first object for heat transfer with a heat transfer medium is passed, are provided in a zone in which a flow of the heat transfer medium (parallel flow) parallel to the axis of the tubes is present, and a second tube, through the inside of which the first object is not passed, is provided in said zone such that it is parallel to the axis of the first tubes; and
   causing a catalytic vapor-phase oxidation reaction in first tubes,
   wherein the second tube includes two or more passages for the inlet or outlet of the heat transfer medium, and
   the first object for heat transfer with the heat transfer medium is a reactant before chemical or physical reaction, a product after the reaction, or a mixture thereof.

14. The method of claim 13, wherein the oxide is unsaturated aldehyde or unsaturated fatty acid.

15. The method of claim 13, wherein a doughnut-type baffle plate and a disc-type baffle plate are alternately provided such that the heat transfer medium flows in an S-shape, and a parallel flow is formed inside of the doughnut-type baffle plate.

16. The method of claim 13, wherein the second tube is provided in a number of two or more in one zone in which the parallel flow is present.

17. A method for increasing the heat transfer coefficient of first tubes, through the inside of which a first object for heat transfer with a heat transfer medium is passed, the first tubes being provided in a zone in which a flow of the heat transfer medium (parallel flow) parallel to the axis of the tubes is present, the method comprising increasing the flow rate of the parallel flow by placing a second tube, through the inside of which the first object is not passed, in said zone such that the second tube is parallel to the axis of the first tubes,
   wherein the second tube includes two or more passages for the inlet or outlet of the heat transfer medium, and
   the first object for heat transfer with the heat transfer medium is a reactant before chemical or physical reaction, a product after the reaction, or a mixture thereof.

* * * * *